July 27, 1926.

W. L. BODMAN

VACUUM VALVE

Filed Dec. 10, 1925

1,594,192

INVENTOR.
Walter Light Bodman.
BY
Ramsay Hoguet,
ATTORNEYS.

Patented July 27, 1926.

1,594,192

UNITED STATES PATENT OFFICE.

WALTER LIGHT BODMAN, OF NEW YORK, N. Y., ASSIGNOR TO ROSS M. TURNER, OF NEW YORK, N. Y.

VACUUM VALVE.

Application filed December 10, 1925. Serial No. 74,479.

My invention relates to improvements in vacuum valves, that is valves which are used in connection with elements in which a vacuum or partial vacuum is to be created and maintained. My invention is especially applicable to structures where it is desirable to maintain a vacuum or a partial vacuum for long periods of time, and the object of my invention is to produce a simple type of valve of this character which can be easily applied to the wall of a chamber in which the vacuum is to be created and maintained, and further to construct the valve so that the vacuum can be easily produced because of the easy working of the valve, and further to construct the apparatus so that the danger of leakage is reduced to a minimum.

Reference is to be had to the accompanying drawings forming a part of this specification, in which similar reference characters indicate corresponding parts in all the views.

Figure 1:
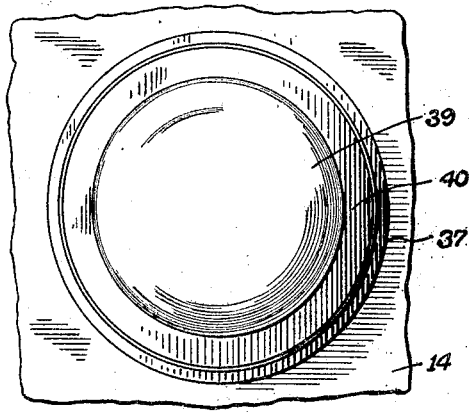
Figure 1 is a front elevation of the valve embodying my invention.

The valve is provided at its inner end with a nipple 10 having a terminal bore 10', and this nipple is externally screw threaded at its outer end as shown at 11 to receive the lock nut 12 which is adapted to be turned snugly against a gasket 13 placed between the nut and the wall 14 of the vacuum chamber. This wall is shown provided with a hole 15 to receive the smaller part of the valve, and an enlargement 16 thereof to receive the larger part of the valve. The nipple 10 has a tube 17 within it, the bore of the tube corresponding to the bore 10' above referred to, and the outer end of the tube is closed as shown at 18, while transversely through the walls thereof are ports 19 which are covered on the outer side by the soft rubber tube 20 extending from the inner end of the chamber 21 of the nipple 10 to the outer end of the nipple. The chamber 21 is slightly larger than the tube for the purpose presently described. The outer end of the nipple 10 screws into the internally screw threaded end of a union fixture 22 which has a transverse bridge 23 therein, the latter being perforated longitudinally of the valve as shown at 24. These perforations align with the open central part of a ring washer 25 which is placed between the bridge 23 and the end of the nipple 10.

Figure 2:
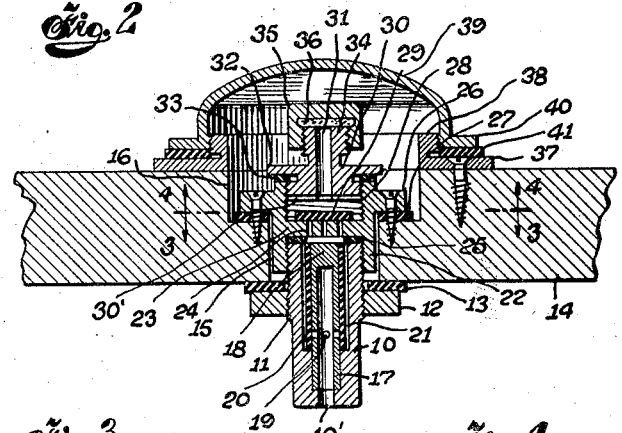
Figure 2 is a cross section of the valve.
Figure 3:
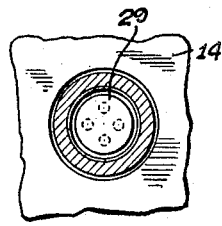
Figure 3 is a cross section on the line 3—4 of Figure 2 looking inward.
Figure 4:
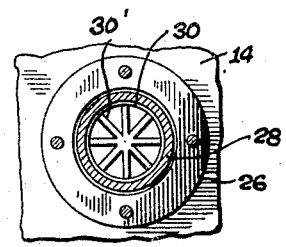
Figure 4 is a cross section on the same line as that of Figure 3 but looking outward.

The union 22 has a flange 26 which overlaps the inner wall of the enlargement 16 above referred to, to facilitate fastening the valve parts to the wall 14, and a washer or gasket 27 is placed between the flange and the wall 14, as shown clearly in Figure 2. The outer portion of the union 22 is formed into a chamber 28 which is internally screw threaded as shown, and in which is held a flat check valve 29 adapted to move freely in and out and to overlie the ports or holes 24 through the bridge 23. The outer portion of the chamber 28 receives a plug 30 having a bore 31 therethrough and having a flange 32 which overlies the outer end of the wall of the chamber 28 and behind which is placed a gasket 33 to insure a tight connection. The plug has radial channels 30' on its inner end to facilitate the outflow of air, as presently described. The outer part of the plug 34 is exteriorly screw threaded to receive a screw cap 35, and within the cap 35 is a soft gasket 36, so that when the cap is screwed home a tight connection will be made.

The hole through the wall 14 is encircled by an escutcheon ring 37 having a flange 38 which is externally screw threaded, and to which is screwed the valve covering or cap 39 which has a flange 40 overlapping the ring 37, and between the flange and ring is a gasket 41. The ring 37 is secured to the part 14, and it will be seen that the disposition of the gaskets and washers 20, 25, 33, 36 and 41 is such as to preclude air leakage.

When the vacuum is to be pulled, the cap 39 is removed as also is the cap 35, and a suction pump is applied to the end 34 of the plug 30. As the air is sucked from the chamber through the bore 10' of the nipple 10, it will pass through the holes 19 and around the inner end of the soft tube 20, thence out through the ports 24, moving the valve 29 from said ports and against the inner end of the plug 30, thence radially through the channels or ports 30' on the inner end of the plug 30 to the bore 31, and thence outward to the pump. The air will flow easily from the chamber through the course indicated, and when the pump is uncoupled, the external pressure serves to force the valve 29 firmly to its seat, and the suction from within the vacuum, and the pressure outside, will cause the tube 20 to fit very snugly over the holes 19 to prevent any outflow of air. The gasket 25 also serves to seal the outer end of the chamber 21, and when the plug 30 and caps 35 and 39 are screwed on, an additional safeguard against leakage is provided which enables the vacuum to be maintained for a very long time.

Thus it will be seen that the structure shown enables a vacuum to be easily pulled, and also safeguards against the leakage of air into the vacuum.

I claim:—

1. A vacuum valve comprising a nipple adapted to extend into the vacuum chamber, a tube within the nipple closed at its outer end and provided with transverse ports, said tube being arranged to leave a chamber between itself and the nipple wall, a soft tubular gasket encircling the tube and covering the ports, and means for opening and closing the outer end of the nipple.

2. A vacuum valve comprising a nipple having a bore through its inner end and an enlarged chamber at the outer end, a tube closed at its outer end and having its inner end registering with the nipple bore, said tube being spaced within the nipple to leave a chamber between itself and the nipple wall, the tube having transverse ports therethrough, a soft tubular gasket fitting the first mentioned tube and covering its ports, a union fixture connected to the outer end of the nipple and having a transverse bridge with ports therethrough, the said union fixture having a chamber in its outer portion, a check valve in said chamber normally covering the said bridge ports, and a bored plug closing the chamber in the said union fixture, said plug having channels on its inner end connecting with its bore.

3. A vacuum valve comprising a union fixture open at both ends and provided with a transverse ported bridge, a nipple secured in the inner end of the fixture, said nipple having a bore through its inner end and an enlarged chamber in its outer portion, a tube closed at its outer end and extending substantially through the nipple, said tube being open at its inner end and having transverse ports through its wall, a soft tubular gasket covering the ports of said tube, a check valve covering the ports through the aforesaid bridge, a bored screw plug closing the outer end of the union fixture, said plug having channels at its inner end connecting with its bore, and a closure for the outer end of the plug.

4. A vacuum valve comprising a union fixture having a transverse ported bridge and an external flange to facilitate its attachment to a support, a nipple connected to the inner end of the fixture and provided with a bore at its inner end and a chamber at its outer portion, a tube within the nipple, said tube being closed at its outer end, open at its inner end, and provided with transverse ports, a soft tubular gasket encircling the tube and covering said ports, a check valve covering the ports of the aforesaid bridge, a plug fitting in the outer end of the union fixture, said plug having a longitudinal bore and channels on its inner end connecting with said bore, and a cap for the plug.

In testimony whereof, I have signed my name to this specification this 20th day of November, 1925.

WALTER LIGHT BODMAN.